United States Patent Office 3,767,767
Patented Oct. 23, 1973

3,767,767
INHIBITING CORROSION OF IRON BY BROMINE
Jack F. Mills, Midland, Mich., assignor to The Dow Chemical Company, Midland, Mich.
No Drawing. Filed Aug. 9, 1971, Ser. No. 170,376
Int. Cl. C01b 7/10; C09k 3/00; C23f 11/08
U.S. Cl. 423—269
9 Claims

ABSTRACT OF THE DISCLOSURE

The corrosion of iron by bromine is substantially inhibited by the presence of a small proportion of chlorine in the bromine.

BACKGROUND OF THE INVENTION

Bromine is very difficult to store because of its very corrosive nature. As a result, a great deal of time and effort has expended in an attempt to solve the problem of bromine storage. Records of these attempts and the problems encountered are well documented, see for example Bloch et al. in U.S. Pat. 3,375,077.

Chlorine can be stored in steel containers without unmanageable problems of corrosion. The result of using a mixture of bromine and chlorine, however, could not be predicted.

SUMMARY OF THE INVENTION

It has now been found according to the present invention that bromine can be safely stored in iron or steel vessels when the bromine contains an amount of chlorine which substantially inhibits corrosion of the vessel. This mixture of bromine and chlorine is surprisingly less corrosive in iron or steel containers than is bromine itself.

The amount of chlorine added to bromine to obtain the desirable effect depends on a number of factors, such as the type of iron container, the temperature of storage and the presence of water. Of course, some iron or steel containers are more susceptible to corrosion than others and may react differently to different concentrations of chlorine in the mixture. Surprisingly, as shown in Table I of the specific embodiments, a small amount of chlorine substantially reduces the rate of corrosion. The optimum amount of chlorine in the mixture can be easily determined by experience.

In the broad concept of the invention, any amount of chlorine which gives the desired protection from corrosion of the iron or steel may suitably be present in the mixture of bromine and chlorine. The mixtures, however, preferably contain less than 90% by weight of chlorine. In the preferred practice of the invention, the mixture in the iron vessel contains about 20 to about 97% by weight of bromine and about 3 to about 80% chlorine. Especially preferred are mixtures of bromine and chlorine which contain about 50 to about 95% bromine and 5 to about 50% chlorine, with mixtures that contain about 60 to about 93% bromine and about 7 to about 40% chlorine being of special interest because of the desirable utility of the mixture as a brominating agent.

The vessels used for the storage of bromine in the present invention has a sufficient amount of iron so that bromine cannot normally be stored in them because of the substantial corrosion encountered. Examples of such containers are numerous and include vessels made of iron, low carbon steel, steel, stainless steels and the like. Preferred metals in the present invention are those which are normally employed in the manufacture of iron or steel cylinders and railroad tank cars. Thus, storage of the bromine mixture of the present invention in iron, steel or stainless steel cylinders or railroad tank cars is of special interest.

An important factor in the feasibility of the practice of the invention is the water concentration in the mixture of bromine and chlorine stored. As is well known in the art, the water concentration is preferably maintained at as low a level as is practical. If the concentration of water is too high, the prevention of corrosion in iron containers is virtually impossible.

The vessels containing mixtures of bromine and chlorine are conveniently prepared by adding a mixture of bromine and chlorine to the vessel or by adding either component of the mixture to the vessel first and then adding the other component.

In the preferred practice of the invention, the iron or steel vessel contains only the mixture of bromine and chlorine. However, the addition of other extraneous materials, such as corrosion inhibitors, stabilizers and the like, is also envisioned to be within the scope of the invention.

SPECIFIC EMBODIMENTS

Examples 1–3 and Comparative Example A.—Mixtures of bromine and chlorine as compared to bromine in the corrosion of low carbon steel The corrosive properties of various mixtures of bromine and chlorine were compared to bromine alone in tests run at room temperature in 16 oz. glass bottles. The bottles had a narrow mouth that could be sealed with a pop bottle cap. A weighed metal coupon was placed in the bottle, and the bottles were flushed with nitrogen, stoppered with a rubber stopper and cooled in a freezer to 0° F. to minimize vaporization of the halogen mixture added. About 80 ml. of liquid halogen were added so that about ½ of the coupon was covered. The bottle was then capped with a pop bottle cap containing a Teflon® insert. If a leak was observed during the test period, the bottle was placed in an ice bath and recapped. The corrosion rates were calculated from the weight lost during the test period using the following formula:

Corrosion rate (mils/yr.)

$$= \frac{\text{Wt. loss (mgs.)} \times K}{\text{Orig. wt. (g.)} \times \text{S.F.} \times \text{time (days)}}$$

where for the specific metal tested:

K=Conversion factor from mg./sq. in./day to mils penetration/yr.
S.F.=Strip factor—average ratio of surface area to weight expressed in sq. in./g.

The results of these experiments are shown in Table I at various concentrations of water in the mixture.

TABLE I.—CORROSION RATE OF MIXTURES OF BROMINE AND CHLORINE AS COMPARED TO BROMINE ALONE FOR LOW CARBON STEEL

| Example | Mixture, wt. percent | | Length of test, days | Corrosion rate, mils/yr. | |
|---|---|---|---|---|---|
| | Br | Cl | | 0.00% $H_2O$ | 0.01% $H_2O$ |
| Comp. A | 100 | 0 | 30 | 13 | 17 |
| 1 | 69 | 31 | 30 | 0.93 | 1.8 |
| 2 | 92 | 8 | 29 | 1.4 | 2.4 |
| 3 | 31 | 69 | 15 | 2.4 | 3.7 |

Thus, as shown in the table, the addition of minor amounts of chlorine to bromine reduce the rate of corrosion by about tenfold and brings such corrosion into an acceptable range.

Example 4.—Bromine containing chlorine in a steel cylinder

A 4-liter steel cylinder normally used to store chlorine was evacuated and charged with 5267 g. of $Br_2$ and 2338 g. of $Cl_2$. The filled cylinder was stored at room temperature for 45 months. After storage, the cylinder was cut open and the inside surface was examined. No pitting or corrosion was observed on the surface of the inner walls.

As shown in the examples above, bromine containing chlorine is not highly corrosive to other metals containing iron, such as steel, stainless steel and iron.

In the practice of the invention, mixtures of bromine and chlorine are placed in vessels containing iron, such as an iron cylinder, a steel railroad tank car or a stainless steel drum, and the mixture is stored without substantially corroding the container.

I claim:

1. Method for inhibiting the corrosive nature of bromine in an iron or steel vessel comprising adding chlorine to said vessel to form a mixture of bromine and chlorine.
2. The method according to claim 1 wherein the mixture of bromine and chlorine contains less than 90% by weight of chlorine.
3. The method according to claim 1 wherein the mixture of bromine and chlorine consists essentially of about 20 to about 97% by weight of bromine and about 3 to about 80% by weight of chlorine.
4. The method of claim 1 wherein the mixture of bromine and chlorine consists essentially of about 50 to about 95% by weight bromine and about 5 to about 50% by weight chlorine.
5. The method of claim 1 wherein the mixture of bromine and chlorine consists essentially of about 60 to about 93% by weight of bromine and about 7 to about 40% by weight chlorine.
6. The method of claim 1 wherein the vessel is a cylinder or tank car made of metal selected from the group consisting of iron, steel and stainless steel.
7. The method of claim 1 wherein the bromine and chlorine are added as a mixture to the vessel.
8. The method of claim 1 wherein bromine is added to the vessel and then chlorine is added to the vessel.
9. The method of claim 1 wherein chlorine is added to the vessel and then bromine is added to the vessel.

References Cited
UNITED STATES PATENTS

| | | | |
|---|---|---|---|
| 3,107,154 | 10/1963 | Schachter et al. | 23—216 X |
| 3,375,077 | 3/1968 | Bloch et al. | 21—2.7 X |
| 2,670,276 | 2/1954 | Bloch et al. | 23—216 |
| 2,948,393 | 8/1960 | Gunkler | 206—84 |
| 2,890,794 | 6/1959 | Deline | 206—84 |
| 3,174,828 | 3/1965 | Hein | 23—216 |

SAMUEL B. ROTHBERG, Primary Examiner

S. E. LIPMAN, Assistant Examiner

U.S. Cl. X.R.

21—2.5; 206—84; 252—387; 423—500